United States Patent
Sato et al.

(10) Patent No.: US 10,988,586 B2
(45) Date of Patent: Apr. 27, 2021

(54) VINYLIDENE FLUORIDE RESIN FILM

(71) Applicant: Kureha Corporation, Tokyo (JP)

(72) Inventors: Nobufumi Sato, Tokyo (JP); Keiko Aita, Tokyo (JP); Hisaaki Terashima, Tokyo (JP); Kazuyuki Kanno, Tokyo (JP); Yusuke Sato, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 16/467,559

(22) PCT Filed: Jan. 16, 2018

(86) PCT No.: PCT/JP2018/000969
§ 371 (c)(1),
(2) Date: Jun. 7, 2019

(87) PCT Pub. No.: WO2018/139262
PCT Pub. Date: Aug. 2, 2018

(65) Prior Publication Data
US 2019/0338091 A1 Nov. 7, 2019

(30) Foreign Application Priority Data
Jan. 25, 2017 (JP) .............................. JP2017-011677

(51) Int. Cl.
*C08J 5/18* (2006.01)
*C08K 3/013* (2018.01)
*H01B 3/44* (2006.01)
*C08K 3/22* (2006.01)
*C08K 3/26* (2006.01)

(52) U.S. Cl.
CPC ............... *C08J 5/18* (2013.01); *C08K 3/013* (2018.01); *H01B 3/44* (2013.01); *C08J 2327/16* (2013.01); *C08K 2003/222* (2013.01); *C08K 2003/2227* (2013.01); *C08K 2003/265* (2013.01)

(58) Field of Classification Search
None
See application file for complete search history.

(56) References Cited

U.S. PATENT DOCUMENTS

| | | | | |
|---|---|---|---|---|
| 4,407,887 A | * | 10/1983 | Hashizume | .............. H01L 37/02 428/332 |
| 8,804,307 B2 | | 8/2014 | Koh et al. | |
| 9,805,868 B2 | | 10/2017 | Nakatsuka et al. | |
| 2010/0110609 A1 | * | 5/2010 | Koh | ....................... H01G 4/206 361/323 |
| 2010/0178483 A1 | | 7/2010 | Masuda et al. | |
| 2012/0094070 A1 | * | 4/2012 | Suzuki | ....................... C08J 5/18 428/141 |
| 2012/0293909 A1 | | 11/2012 | Tatemichi et al. | |
| 2015/0377278 A1 | * | 12/2015 | Smith | ..................... F16B 39/24 411/103 |

FOREIGN PATENT DOCUMENTS

| | | |
|---|---|---|
| CN | 106024946 A | 10/2016 |
| CN | 106029754 A | 10/2016 |
| JP | S4637972 B | 11/1971 |
| JP | S60199046 A | 10/1985 |
| JP | S61123520 A | 6/1986 |
| JP | S61198614 A | 9/1986 |
| JP | S6325024 A | 2/1988 |
| JP | 10284340 A * | 10/1998 |
| JP | 2008280508 A | 11/2008 |
| JP | 2009062456 A | 3/2009 |
| JP | 2014082523 A | 5/2014 |
| KR | 10-2012-0123432 A | 11/2012 |
| WO | WO2008090947 A1 | 7/2008 |
| WO | WO2013146367 A1 | 10/2013 |
| WO | WO2015129851 A1 | 9/2015 |

OTHER PUBLICATIONS

Machine translation of JP 10284340 A, retrieved Sep. 2020. (Year: 2020).*
Anonymous, "Horiba Scientific, A Guidebook to Particle Size Analysis," Jan. 1, 2012, pp. 1-32, Irvine, CA 92618, USA.
Extended European Search Report dated Jan. 21, 2020, in European Patent Application No. 18744722.2.
English translation of International Preliminary Report on Patentability and Written Opinion dated Aug. 8, 2019, in PCT/JP2018/000969 (Forms PCT/IB/338, PCT/IB/373, and PCT/ISA/237).
International Search Report for PCT/JP2018/000969 dated Apr. 17, 2018.
Translation of the International Search Report for PCT/JP2018/000969 dated Apr. 17, 2018.
Office Action dated Jun. 2, 2020, in Japanese Patent Application No. 2018-564491.
Office Action dated Dec. 14, 2020, in Republic of Korea Patent Application No. 10-2019-7012771.
Communication pursuant to Article 94(3) EPC dated Sep. 11, 2020, in EP 18 744 722.2.
Office Action dated Feb. 10, 2021, in Chinese Patent Application No. 201880004276.3.

* cited by examiner

*Primary Examiner* — Nicole M. Buie-Hatcher
(74) *Attorney, Agent, or Firm* — Birch, Stewart, Kolasch & Birch, LLP

(57) ABSTRACT

Provided is a vinylidene fluoride resin film that is produced using a film composition including at least a vinylidene fluoride resin and inorganic particles; and that includes a plurality of protrusions on at least one surface thereof. Among the plurality of protrusions, the number of protrusions greater than 0.10 μm in height from a flat surface at which the protrusions are not present is from 7.0 to 50 per 0.10 mm² of the vinylidene fluoride resin film.

6 Claims, No Drawings

VINYLIDENE FLUORIDE RESIN FILM

TECHNICAL FIELD

The present invention relates to a vinylidene fluoride resin film, and particularly relates to a vinylidene fluoride resin film having a high relative permittivity.

BACKGROUND ART

Plastic insulators, having characteristics such as high insulation resistance, excellent frequency characteristics, and excellent flexibility, are expected to be used as film materials for film capacitors for communication, electronic devices, power supply, medium/low voltage phase-advance, and inverters, and film materials for piezoelectric elements, pyroelectric elements, dielectrics for carrying a transfer body, and the like.

In recent years, various electrical equipment being controlled by inverters, and a demand for a capacitor with a smaller size and a greater capacity is increasing accordingly. Such a demand in the market, particularly in automobile application (including hybrid car application), has prompted a further decrease in the film thickness while prompting an improvement in the breakdown strength of film capacitors or the processability of elements as essential.

It is known that a film capacitor with a smaller thickness and a higher dielectric constant can provide an element with a large capacitance. A typical film capacitor uses a resin having a relatively low dielectric constant, such as polypropylene, but it has been proposed to produce a film capacitor having a high relative permittivity by using a vinylidene fluoride resin, which has a high dielectric constant.

Regarding the vinylidene fluoride resin, for example, Patent Document 1 discloses a vinylidene fluoride resin composition including from 95 to 30 wt. % of a vinylidene fluoride resin and from 5 to 70 wt. % of a polyether. Patent Document 1 describes polyoxymethylene as an example of the polyether.

For example, Patent Documents 2 to 5 describe techniques relating to the film.

The film described in Patent Document 2 is a high-dielectric film, formed using a fluororesin including a total of not less than 95 mol % of vinylidene fluoride units and tetrafluoroethylene units, and is a film for a film capacitor that has a high dielectric property and high breakdown voltage and that can be made thinner.

The film described in Patent Document 3 is a film having a high dielectric constant including a vinylidene fluoride resin and inorganic particles.

On the other hand, the film described in Patent Document 4 is a biaxially stretched polypropylene film in which a target surface morphology is formed by utilizing crystal modification of a polypropylene film.

Furthermore, Patent Document 5 describes a stretched film made from a syndiotactic polystyrene resin composition. The stretched film includes two types of particles having different particle sizes, and at least one of the particles is a silica particle.

CITATION LIST

Patent Literature

Patent Document 1: JP 60-199046 A
Patent Document 2: WO 2008/090947
Patent Document 3: JP 2014-82523 A
Patent Document 4: WO 2013/146367
Patent Document 5: JP 2009-062456 A

SUMMARY OF INVENTION

Technical Problem

However, in the vinylidene fluoride resin film of Patent Document 2, dielectric breakdown may occur, and there is a problem in the winding property of the film.

The biaxially stretched polypropylene film described in Patent Document 4 has a low dielectric constant. Therefore, there are limitations on reducing the size of capacitors and the like produced using such films.

As a method for improving the winding property of a resin film, a method is known in which silica particles are blended in the film, as described in Patent Document 5. In general, in a case where inorganic particles are blended in a resin such as fluororesin, which has a low surface energy, the inorganic particles affect the film properties such as dispersibility, film processability, and film winding property. However, the effects of the inorganic particles blended in a resin having a low surface energy may not be as comparable as the effects caused by the inorganic particles in a typical resin film. In particular, when a vinylidene fluoride resin and a silicon oxide compound are melt-kneaded, the vinylidene fluoride resin may decompose, which is not preferable.

The present invention is conceived in light of the problems described above, and an object of the present invention is to provide a vinylidene fluoride resin film that can be made thinner and has an improved film winding property.

Solution to Problem

In order to solve the problems described above, the vinylidene fluoride resin film according to an embodiment of the present invention is a vinylidene fluoride resin film including a film composition including a vinylidene fluoride resin and inorganic particles, wherein the vinylidene fluoride resin film includes a plurality of protrusions on at least one surface thereof; and among the plurality of protrusions, the number of protrusions greater than 0.10 μm in height from a flat surface at which the protrusions are not present is from 7.0 to 50 per 0.10 mm$^2$ of the vinylidene fluoride resin film.

Advantageous Effects of Invention

According to an embodiment of the present invention, a vinylidene fluoride resin film that can be made thinner and has an improved film winding property can be provided.

DESCRIPTION OF EMBODIMENTS

The vinylidene fluoride resin film according to an embodiment of the present invention (hereinafter, also simply referred to as "film") is a vinylidene fluoride resin film including a film composition including at least a vinylidene fluoride resin and inorganic particles, wherein the vinylidene fluoride resin film includes a plurality of protrusions on at least one surface thereof; and among the plurality of protrusions, the number of protrusions greater than 0.10 μm in height from a flat surface at which the protrusions (fillers) are not present is from 7.0 to 50 per 0.10 mm$^2$ of the vinylidene fluoride resin film.

Details of the vinylidene fluoride resin film will be described below.

Film Composition

The film composition according to the present embodiment is a composition including at least a vinylidene fluoride resin and inorganic particles.

In the present specification, a vinylidene fluoride resin refers to a polymer including a vinylidene fluoride monomer as a main component. In the present embodiment, a homopolymer of vinylidene fluoride is typically used for the vinylidene fluoride resin, but a copolymer thereof can also be used. The vinylidene fluoride copolymer includes preferably not less than 90%, more preferably not less than 95%, and even more preferably not less than 97% of a vinylidene fluoride monomer. When the content of monomers other than the vinylidene fluoride monomer is too high, problems such as a decrease in the melting point and a decrease in the dielectric constant of the vinylidene fluoride resin are anticipated.

Such a vinylidene fluoride resin, having a high relative permittivity (s), is preferable as a material for a high-dielectric film.

The relative permittivity of the vinylidene fluoride resin of the present embodiment (23° C., 20 kHz) is preferably not less than 6.0, more preferably not less than 8.0, and even more preferably not less than 9.0.

The vinylidene fluoride resin of the present embodiment may be a vinylidene fluoride copolymer of a vinylidene fluoride monomer and another monomer, or it may be a vinylidene fluoride homopolymer consisting of only one type of vinylidene fluoride monomer. Examples of the other monomer include vinyl fluoride, trifluoroethylene, tetrafluoroethylene, chlorotrifluoroethylene, hexafluoropropylene, perfluoroalkyl vinyl ethers represented by perfluoromethyl vinyl ether. Hexafluoropropylene is most preferable from the perspective of ease in processing as the other monomer.

The vinylidene fluoride resin of the present embodiment is preferably a vinylidene fluoride homopolymer or a vinylidene fluoride-hexafluoropropylene copolymer or a mixture thereof. Furthermore, in a case where the vinylidene fluoride resin of the present embodiment is a mixture of the vinylidene fluoride homopolymer and the vinylidene fluoride-hexafluoropropylene copolymer, the mixing ratio thereof is not particularly limited.

The molecular structure of the vinylidene fluoride resin of the present embodiment may be linear or branched.

As the vinylidene fluoride resin of the present embodiment, for example, a known linear polyvinylidene fluoride (for example, KF #1100, available from Kureha Corporation) can be suitably used.

The average particle size of the inorganic particles in the present embodiment is preferably from 0.60 μm to 1.8 μm, more preferably from 0.70 μm to 1.6 μm, and even more preferably from 0.80 μm to 1.2 μm. The reason that the average particle size of the inorganic particles is preferably within this range is that in a case where the inorganic particles are too small, there is a risk that the protrusions are small, and the winding property of the film may deteriorate. On the other hand, in a case where the inorganic particles are too large, there is a risk that the protrusions become large, and the film may break at the time of stretching.

The inorganic particles of the present embodiment are preferably, for example, particles of one or more types of inorganic compounds selected from the group consisting of calcium carbonate, aluminum oxide, and magnesium oxide. Note that in a case where the film composition includes two or more types of inorganic particles, the blending ratio of the inorganic particles is not particularly limited.

Examples of the calcium carbonate that can be used include publicly known products such as SOFTON™ 2200, SOFTON™ 2600, SOFTON™ 3200 (all available from Shiraishi Calcium Kaisha, Ltd.), and SL-2200 (available from Takehara Kagaku Kogyo Co., Ltd.).

Examples of the aluminum oxide that can be used include publicly known products available from Sumitomo Chemical Co., Ltd., Kojundo Chemical Laboratory Co., Ltd., Kawai Lime Industry Co., Ltd., and the like Furthermore, examples of the magnesium oxide that can be used include publicly known products available from Konoshima Chemical Co., Ltd., Sakai Chemical Co., Ltd., and the like.

The film composition of the present embodiment includes from 0.050 parts by weight to 5.0 parts by weight, preferably from 0.050 parts by weight to 2.5 parts by weight, and more preferably from 0.10 parts by weight to 1.0 parts by weight of the inorganic particles, per 100 parts by weight of the vinylidene fluoride resin. The content of the inorganic particles within this range is preferable in that the winding property of the film is improved and the film can be stretched without breaking.

The film composition of the present embodiment may include other resins in addition to the vinylidene fluoride resin and inorganic particles. For example, the film composition may include from 0.10 parts by weight to 10 parts by weight, more preferably from 0.50 parts by weight to 5.0 parts by weight, and even more preferably from 1.0 parts by weight to 3.0 parts by weight of a polymeric processing aid, per 100 parts by weight of the vinylidene fluoride resin. As the polymeric processing aid, an acrylic processing aid, METABLEN™ P531A (available from Mitsubishi Rayon Co., Ltd.) is preferable from the perspective of improving the smoothness and stretchability of the film.

Method for Producing Vinylidene Fluoride Resin Film

An embodiment of the method for producing the vinylidene fluoride resin film according to the present embodiment will be described below.

The vinylidene fluoride resin film according to the present embodiment can be obtained by, for example, mixing inorganic particles to pellets made from a vinylidene fluoride resin, melt-extruding the vinylidene fluoride resin to form a film, and then further stretching the film. An example of a method for producing a vinylidene fluoride resin film will be described in detail below, but the method for producing the vinylidene fluoride resin film according to the present embodiment is not limited to the following method.

Pellets made from a polyvinylidene fluoride resin (hereinafter, also referred to as "polyvinylidene fluoride pellets") can be obtained by, for example, blending 0.10 parts by weight (as an added amount of $CaCO_3$) of calcium carbonate (SL2200, available from Takehara Kagaku Kogyo Co., Ltd., $CaCo_3$ grade) in 100 parts by weight of a linear polyvinylidene fluoride resin (KF #1100, available from Kureha Corporation), which has a density of 1.77 to 1.79 g/cm³, a melt flow rate (MFR) of 2 to 4 g/10 minutes, and a melt viscosity of 3300 Pa·s; supplying the mixture to a co-rotating twin screw extruder with a feeder (TEM-26SS, available from Toshiba Machine Co., Ltd., screw diameter: 26 mm (L/D=48.5)); melt-kneading at a screw rotational speed of 200 rpm; and melt-extruding a mixed resin.

At that time, the setting temperature of the extruder may be any temperature at which the mixed resin can be melt-extruded, and the temperature may be, for example, from 150° C. to 250° C.

The melt-extruded resin is cut, for example, with a pelletizer, and thus polyvinylidene fluoride pellets including inorganic particles can be obtained.

The vinylidene fluoride resin film according to the present embodiment can be obtained by forming a film by melt extrusion using the polyvinylidene fluoride pellets including inorganic particles, obtained as described above, and by stretching the obtained unstretched film.

Examples of the stretching method include biaxial stretching. Hereinafter, a method for producing a polyvinylidene fluoride film obtained by biaxial stretching (hereinafter, also referred to as "biaxially stretched polyvinylidene fluoride film") will be described in detail.

Polyvinylidene fluoride pellets including inorganic particles are first supplied to a known melt extruder. A single screw or twin screw extruder can be used as the extruder in the production of the biaxially stretched polyvinylidene fluoride film.

The obtained polymer, which has been melted and extruded by the extruder, is filtered through a filter. This filtration eliminates foreign substances included in the polymer, for example, foreign substances included in the raw material, foreign substances that are mixed from the outside during the molding process of the film, and inorganic particles that are too large in size. The filter can be appropriately selected from filters having an aperture with a size range in which an increase in resin pressure does not substantially affect the processability of the film. Subsequently, the polymer is extruded into a sheet form through a T-die, for example, and cooled and solidified on a casting roll to produce an unstretched film.

The biaxially stretched polyvinylidene fluoride film can be produced using, for example, sequential stretching. At that time, the first stretching in the longitudinal direction is performed at a stretching temperature from 110° C. to 170° C., preferably from 140° C. to 165° C., and at a stretching ratio from 2.0 times to 10 times, preferably from 2.5 times to 4.0 times. The stretching temperature in the longitudinal direction is important in suppressing the occurrence of scratches, and when the stretching temperature in the longitudinal direction is lower than 110° C., scratches may occur on the film surface, or the film may have a tendency to break. On the other hand, when the temperature during stretching in the longitudinal direction is higher than 170° C., the film surface undergoes thermal damage and the film becomes brittle, which is not preferable.

Thereafter, stretching is performed with a tenter stretching machine (available from Ichikin Co., Ltd.) set to, for example, from 110° C. to 170° C., and preferably from 140° C. to 165° C., at a stretching ratio from 2.0 times to 10 times and preferably from 3.0 times to 5.0 times in the width direction. When the temperature during stretching in the width direction is lower than 110° C., the film tends to break, and when the stretching temperature in the width direction is higher than 170, sufficient strength cannot be obtained, which is not preferable. Such temperatures are also not preferable from the perspective that uneven stretch marks occur, and the film undergoes thermal damage. Note that the total of the stretching ratios in the longitudinal direction and in the width direction is from 4.0 times to 20 times and preferably from 5.0 times to 10 times from the perspective of preventing the occurrence of uneven stretch marks. When the total stretching ratio is less than 4.0 times, the uneven stretch marks tend to occur, and a sufficient strength is less likely to be imparted to the film. Furthermore, when the total stretching ratio is greater than 10 times, the film tends to break, and thus stable film production is difficult.

In the present embodiment, the ratio can be appropriately selected to achieve a target strength at break. In order to increase the strength at break in the width direction, the stretching ratio in the width direction is even more preferably set to be higher than that in the longitudinal direction. The biaxially stretched film is slit to a more appropriate width and length and wound in a slit process.

Note that the method for producing the vinylidene fluoride resin film according to the present embodiment is not limited to the method described above, and for example, a polyvinylidene fluoride resin alone and inorganic particles may be added in the production of the vinylidene fluoride resin film (film roll). Alternatively, pellets including inorganic particles and a polyvinylidene fluoride resin alone may be mixed in the production of the vinylidene fluoride resin film (film roll).

Vinylidene Fluoride Resin Film

For example, the vinylidene fluoride resin film of the present embodiment obtained as described above includes a plurality of protrusions on at least one side thereof. Note that in the present embodiment, the protrusions may be formed on both sides of the vinylidene fluoride resin film.

Among the plurality of protrusions of the vinylidene fluoride resin film of the present embodiment, the number of protrusions greater than 0.10 μm in height from a flat surface is from 7.0 to 50 per 0.10 $mm^2$ of the vinylidene fluoride resin film. With the number of protrusions in this range, there is no risk of air entrapment in the film when winding the vinylidene fluoride resin film. Furthermore, with this range, the occurrence of wrinkles, streaks, and the like on the surface of the vinylidene fluoride resin film can be effectively prevented.

Note that in the present specification, "flat surface" specifically refers to a surface in which no protrusions are formed.

The average protrusion height of the protrusions of the vinylidene fluoride resin film is preferably from 0.40 μm to 0.80 μm, more preferably from 0.40 μm to 0.60 μm, and even more preferably from 0.40 μm to 0.50 μm. The average protrusion height of the protrusions within this range is preferable from the perspective of improving the winding property of the film.

Note that in the present specification, "average protrusion height" of protrusions refers to the average value of heights of protrusions greater than 0.10 μm in height present on the surface of the vinylidene fluoride resin film from a film flat surface.

Note that in the present specification, the number of protrusions is the number of protrusions greater than 0.10 μm in height, which is determined by specifying an area in a laser microscope (available from Keyence Corporation) and counting the number of protrusions greater than 0.10 μm in height from a film flat surface included in the area by using an analysis software. In order to accurately count the number of protrusions, the number of protrusions is preferably counted with the field of view magnified at least not less than 10 times and preferably not less than 50 times.

The film thickness of the vinylidene fluoride resin film of the present embodiment is preferably from 1.0 μm to 8.0 μm, more preferably from 1.5 μm to 5.0 μm, and even more preferably from 1.5 μm to 3.0 μm. With this range, products such as capacitors produced using the vinylidene fluoride resin film according to the present embodiment can be made smaller.

Note that in the vinylidene fluoride resin film of the present embodiment, the relationship $0.14<d/t<0.75$ is preferably satisfied, where the average particle size of the inorganic particles included in the film composition is d (μm), and the film thickness of the vinylidene fluoride resin film is t (μm). This can reduce the risk of breakage during use, and thus provide a vinylidene fluoride resin film that can be suitably wound.

Furthermore, in the vinylidene fluoride resin film of the present embodiment, the coefficient of static friction thereof is from 0.20 to 0.50, more preferably from 0.30 to 0.50, and even more preferably from 0.40 to 0.50. With this range, the occurrence of unevenness caused by distortion of the film such as wrinkles and streaks on the surface of the film can be effectively prevented, and the winding property is improved. Note that in the present specification, "coefficient of static friction" refers to the coefficient of friction when the film starts sliding.

In addition, the vinylidene fluoride resin film of the present embodiment includes a vinylidene fluoride resin as a base material and thus has a high relative permittivity.

In addition, the vinylidene fluoride resin film of the present embodiment including protrusions exhibits an improved film winding property.

The breakdown voltage of the vinylidene fluoride resin film of the present embodiment is not less than 500 kV/mm, and the dielectric strength is sufficiently high. Therefore, the vinylidene fluoride resin film of the present embodiment can be stably used as a film capacitor compared to a vinylidene fluoride resin film produced using only a vinylidene fluoride resin.

Note that "dielectric strength" or "strength at dielectric breakdown" refers to a breakdown voltage per thickness, that is, a value obtained by dividing the dielectric breakdown voltage by the thickness of the insulator (in the present specification, the film), as defined in JIS-C 2110 and JIS-C 2151.

Therefore, for example, a metal vapor-deposited capacitor, in which a metal vapor-deposited film formed on the vinylidene fluoride resin film of the present embodiment is used as an electrode, is less likely to experience a short-circuit and less likely to result in dielectric breakdown even in abnormal discharge. In addition, even when defects occur due to repeated use of such a metal vapor-deposited capacitor, gaps between the films allow rapid cooling and releasing of the generated gas, thereby improving safety ("self-healing" property).

From this perspective, the vinylidene fluoride resin film of the present embodiment is preferably used in, for example, a capacitor.

As is clear from the description above, in the vinylidene fluoride resin film of the present embodiment, the coefficient of static friction is preferably from 0.20 to 0.50.

In addition, in the vinylidene fluoride resin film of the present embodiment, the relationship 0.14<d/t<0.75 is preferably satisfied, where the average particle size of the inorganic particles is d (μm), and the film thickness of the vinylidene fluoride resin film is t (μm).

In addition, in the vinylidene fluoride resin film of the present embodiment, the film composition preferably includes from 0.050 parts by weight to 5.0 parts by weight of the inorganic particles, per 100 parts by weight of the vinylidene fluoride resin.

In addition, in the vinylidene fluoride resin film of the present embodiment, the inorganic particles are preferably particles of one or more types of inorganic compounds selected from the group consisting of calcium carbonate, aluminum oxide, and magnesium oxide.

In addition, in the vinylidene fluoride resin film of the present embodiment, as the vinylidene fluoride resin, a vinylidene fluoride homopolymer is preferably used, but a vinylidene fluoride-hexafluoropropylene copolymer or a mixture thereof can be used.

In addition, in the vinylidene fluoride resin film of the present embodiment, the film thickness thereof is preferably from 1.0 μm to 10 μm.

In addition, in the vinylidene fluoride resin film of the present embodiment, the average particle size of the inorganic particles is preferably from 0.50 μm to 2.0 μm.

In addition, in the vinylidene fluoride resin film of the present embodiment, the average height of the protrusions is preferably from 0.40 μm to 1.0 μm.

The present invention is not limited to the embodiments described above, and various modifications are possible within the scope indicated in the claims. Embodiments obtained by appropriately combining the technical means disclosed by other embodiments are also included in the technical scope of the present invention.

EXAMPLES

An embodiment of the present invention will be described below in detail based on examples, but the present invention is not limited to these examples.

Example 1

Production of Film
Preparation of Film Composition

To 100 parts by weight of a linear polyvinylidene fluoride resin (KF #1100, available from Kureha Corporation) having a melt flow rate (MFR) of 2 to 4 g/10 minutes, 0.10 parts by weight of calcium carbonate (SOFTON™ 3200, available from Shiraishi Calcium Kaisha, Ltd., average particle size: 0.86 μm) were added as inorganic particles and uniformly mixed to prepare a film composition.

Production of Pellets

The film composition obtained as described above was supplied to a co-rotating twin screw extruder (available from Toshiba Machine Co., Ltd., TEM-26) with the temperature controlled at from 160° C. to 230° C., and melt-kneaded to produce pellets.

Production of Unstretched Sheet

The pellets obtained as described above were charged into a single screw extruder (available from Union Plastics Co., Ltd.), and a kneaded resin material with a resin temperature of from 270° C. to 280° C. was filtered through a 200 mesh stainless steel filter and then extruded from a T-die. The extrudate was first casted on a first metal drum with the surface thereof held at 100° C., and then the casted material was further cooled on a second metal drum with the surface thereof held at 50° C. Thus, an unstretched sheet was produced from the film composition.

Production of Film

The unstretched sheet obtained as described above was uniaxially stretched in the longitudinal direction at from 150 to 160° C. using a stretching roll, then introduced into a tenter stretching machine set at 150° C. to 160° C., and stretched in the transverse direction to obtain a biaxially stretched film with a thickness of 2.0 μm.

Example 2

A biaxially stretched film with a thickness of 3.2 μm was produced in the same manner as in Example 1.

Example 3

A biaxially stretched film with a thickness of 2.2 μm was produced in the same manner as in Example 1 with the exception that the added amount of calcium carbonate was changed to 0.30 parts by weight.

Example 4

A biaxially stretched film with a thickness of 2.8 μm was produced in the same manner as in Example 3.

Example 5

A biaxially stretched film with a thickness of 2.2 μm was produced in the same manner as in Example 1 with the exception that SOFTON™ 3200 was changed to SOFTON™ 2600 (available from Shiraishi Calcium Kaisha, Ltd., average particle size: 0.91 μm).

Example 6

A biaxially stretched film with a thickness of 3.2 μm was produced in the same manner as in Example 5.

Example 7

A biaxially stretched film with a thickness of 2.1 μm was produced in the same manner as in Example 1 with the exception that the added amount of SOFTON™ 2600 was changed to 0.30 parts by weight.

Example 8

A biaxially stretched film with a thickness of 2.8 μm was produced in the same manner as in Example 7.

Example 9

A biaxially stretched film with a thickness of 1.8 μm was produced in the same manner as in Example 1 with the exception that SOFTON™ 3200 was changed to SOFTON™ 2200 (available from Shiraishi Calcium Kaisha, Ltd., average particle size: 1.2 μm).

Example 10

A biaxially stretched film with a thickness of 2.9 μm was produced in the same manner as in Example 9.

Example 11

A biaxially stretched film with a thickness of 5.1 μm was produced in the same manner as in Example 10.

Example 12

A biaxially stretched film with a thickness of 2.0 μm was produced in the same manner as in Example 9 with the exception that the added amount of SOFTON™ 2200 was changed to 0.30 parts by weight.

Example 13

A biaxially stretched film with a thickness of 2.9 μm was produced in the same manner as in Example 12.

Example 14

A biaxially stretched film with a thickness of 5.5 μm was produced in the same manner as in Example 12.

Example 15

A biaxially stretched film with a thickness of 8.3 μm was produced in the same manner as in Example 12.

Example 16

A biaxially stretched film with a thickness of 3.2 μm was produced in the same manner as in Example 1 with the exception that SOFTON™ 3200 was changed to SL-2200 (available from Takehara Kagaku Kogyo Co., Ltd., average particle size: 1.6 μm).

Example 17

A biaxially stretched film with a thickness of 5.1 μm was produced in the same manner as in Example 16.

Example 18

A biaxially stretched film with a thickness of 7.6 μm was produced in the same manner as in Example 16.

Example 19

A biaxially stretched film with a thickness of 3.6 μm was produced in the same manner as in Example 16 with the exception that the added amount of SL-2200 was changed to 0.30 parts by weight.

Example 20

A biaxially stretched film with a thickness of 5.3 μm was produced in the same manner as in Example 19.

Example 21

A biaxially stretched film with a thickness of 8.4 μm was produced in the same manner as in Example 19.

Comparative Example 1

A biaxially stretched film with a thickness of 2.0 μm was produced in the same manner as in Example 1 with the exception that no calcium carbonate was added.

Comparative Example 2

A biaxially stretched film with a thickness of 3.0 μm was produced in the same manner as in Comparative Example 1.

Comparative Example 3

A biaxially stretched film with a thickness of 3.0 μm was produced in the same manner as in Example 1 with the exception that SOFTON™ 3200 was changed to Brilliant 1500 (available from Shiraishi Calcium Kaisha, Ltd., average particle size: 0.38 μm), and the added amount of Brilliant 1500 was 0.30 parts by weight.

Comparative Example 4

A biaxially stretched film with a thickness of 5.5 μm was produced in the same manner as in Comparative Example 3 with the exception that Brilliant 1500 was changed to SOFTON™ 3200 and the added amount of SOFTON™ 3200 was 0.10 parts by weight.

Comparative Example 5

A biaxially stretched film with a thickness of 8.1 μm was produced in the same manner as in Comparative Example 4.

Comparative Example 6

A biaxially stretched film with a thickness of 5.3 μm was produced in the same manner as in Comparative Example 4 with the exception that the added amount of SOFTON™ 3200 was changed to 0.30 parts by weight.

Comparative Example 7

A biaxially stretched film with a thickness of 8.2 μm was produced in the same manner as in Comparative Example 6.

Comparative Example 8

A biaxially stretched film with a thickness of 5.4 μm was produced in the same manner as in Comparative Example 4 with the exception that SOFTON™ 3200 was changed to SOFTON™ 2600 (available from Shiraishi Calcium Kaisha, Ltd., average particle size: 0.91 μm).

Comparative Example 9

A biaxially stretched film with a thickness of 7.8 μm was produced in the same manner as in Comparative Example 8.

Comparative Example 10

A biaxially stretched film with a thickness of 5.2 μm was produced in the same manner as in Comparative Example 8 with the exception that the added amount of SOFTON™ 2600 was changed to 0.30 parts by weight.

Comparative Example 11

A biaxially stretched film with a thickness of 7.8 μm was produced in the same manner as in Comparative Example 10.

Comparative Example 12

A biaxially stretched film with a thickness of 8.0 μm was produced in the same manner as in Comparative Example 5 with the exception that SOFTON™ 3200 was changed to SOFTON™ 2200 (available from Shiraishi Calcium Kaisha, Ltd., average particle size: 1.2 μm)

Comparative Example 13

An attempt was made to produce a biaxially stretched film with a thickness of 2.0 μm in the same manner as in Comparative Example 1 with the exception that 0.10 parts by weight of SL-2200 (available from Takehara Kagaku Kogyo Co., Ltd., average particle size: 1.6 μm) was added, but the film was broken when stretching and thus could not be obtained.

Comparative Example 14

An attempt was made to produce a biaxially stretched film with a thickness of 2.0 μm in the same manner as in Comparative Example 13 with the exception that the added amount of SL-2200 was changed to 0.30 parts by weight, but the film was broken when stretching and thus could not be obtained.

Evaluation of Inorganic Particle Size

The following tests were performed on the inorganic particles of Examples 1 to 21 and Comparative Examples 1 to 14.

The inorganic particles were dispersed in an aqueous solution of sodium hexametaphosphate (available from Wako Pure Chemical Industries, Ltd.) and subjected to ultrasonic treatment. Then, the particle size was measured using a particle size distribution measurement device ("MicroTrac MT3300 EX II," available from MicrotracBEL Corp.). The refractive index of the dispersion solvent was 1.33, and the refractive index of the inorganic particles was 1.49.

Film Evaluation

The following tests were performed on the films of Examples 1 to 21 and Comparative Examples 1 to 14.

Film Thickness Measurement

The film was folded into a film with 10 panels and then 40 positions were marked at 5.0 mm intervals in the TD direction in along the center of the film. Then, the film thicknesses were measured for all 40 positions using a benchtop thickness gauge ("TOF-5R", available from Yamabun Electronics Co., Ltd.) according to the micrometer method. An average thickness of the thicknesses at 40 positions was then determined by dividing each of the thicknesses at 40 points by 10 and then calculating an average of the total of the divided values.

(average particle size ($d$)/film thickness ($t$))

The value of average particle size (d)/film thickness (t) was calculated using the film thickness obtained as described above.

Average Protrusion Height and Number of Protrusions

The surface morphology of the film was measured using a shape analysis laser microscope ("VK-X250", available from Keyence Corporation), and the average protrusion height of protrusions greater than 0.10 μm from a flat surface at which protrusions are not present, and the number of protrusions per 0.10 mm² were calculated from the observed image by the volume area measurement analysis. Note that the number of measurements per sample was 10, and the average value was determined from all measurements. The setting conditions of the shape analysis laser microscope are as follows. Note that the details of the measuring instrument and conditions are as follows.

Roughness standard: ISO 25178-2:2012
Objective lens: 50 times
Filter type: Gaussian
S-filter: None
F-operation: None
L-filter: 0.080 mm
Terminal effect correction: Effective
1 shot measurement area: 212.347×287.222 (μm²)
Measurement area: 3×3 views (9 shots)
Measurement parameters: Average protrusion height (St), number of protrusions per 0.10 mm²(Pc)
Analysis area: 0.40×0.60 (mm²)
Height threshold: 0.10 μm
Lower limit setting value of microregion: 100 pixel Coefficient of Friction The coefficient of static friction was determined in accordance with JIS-K 7125:1999 with the exception that a vinylidene fluoride resin film was adhered to a glass plate, a polypropylene film (Pylen film-CT P1011, available from Toyobo Co., Ltd.) with a thickness of 40 μm was adhered to a metal sliding piece, and measurement was performed without a spring. Note that the number of measurements per sample was 5 times, and the average value was determined from all measurements. The measuring instrument and conditions are as described below.

Measuring instrument: Friction measuring instrument ("TR model," available from Toyo Seiki Seisaku-sho, Ltd.)
Measurement direction: Film longitudinal direction
Test speed: 100 mm/min
Mass of sliding piece: 200 g Winding Property The film was wound and wrinkles (longitudinal streaks) or displacement occurred in the film after winding were visually observed. A case where the number of wrinkle occurrence in the film after winding was less than 5 was evaluated as the film winding property being "good: A," and a case where the number of wrinkles was not less than 5 was evaluated as the film winding property being "poor: B." Note that a film with the winding property being evaluated as "good: A" is considered to be a film that can be placed in practical use.

Film Processability

A case where the film could be made without breaking when the film was made by stretching was evaluated as the film processability being "good: A," and a case where the film could not be made due to occurrence of breaking or the like was evaluated as the film processability being "poor: B."

Dielectric Strength (Breakdown Voltage)

The measurement of breakdown voltage was performed in accordance with JIS-C 2151. The dielectric strength was determined by dividing the measurement of the breakdown voltage by the film thickness of the sample and denoted as kV/mm. The measuring instrument and conditions are as follows:

Measuring instrument: DC Hipot (withstanding voltage)/insulation resistance tester (TOS5301s), available from Kikusui Electronics Corp.
Voltage increase rate: 0.25 kV/sec
Upper limit current: 20 μA
Spherical electrode: φ6.0 mm
Number of measurements: n=100

Among the measurement results described above, the measurement results related to the material and shape of the films corresponding to examples are summarized in Table 1. The measurement results related to the material and shape of the films corresponding to comparative examples are summarized in Table 2. In addition, the measurement results related to the properties of the films of examples and comparative examples are summarized in Table 3.

TABLE 1

| | Calcium carbonate | | | Film | | | |
|---|---|---|---|---|---|---|---|
| | Type | Average particle size d (μm) | Added amount (phr) | Thickness t (μm) | St (μm) | Pc (number of protrusions/ 0.1 mm$^2$) | d/t (—) |
| Example 1 | SOFTON™ | 0.86 | 0.10 | 2.0 | 0.44 | 11 | 0.43 |
| Example 2 | 3200 | 0.86 | 0.10 | 3.2 | 0.40 | 7.8 | 0.27 |
| Example 3 | SOFTON™ | 0.86 | 0.30 | 2.2 | 0.43 | 27 | 0.39 |
| Example 4 | 3200 | 0.86 | 0.30 | 2.8 | 0.45 | 10 | 0.31 |
| Example 5 | SOFTON™ | 0.91 | 0.10 | 2.2 | 0.45 | 24 | 0.41 |
| Example 6 | 2600 | 0.91 | 0.10 | 3.2 | 0.44 | 7.2 | 0.28 |
| Example 7 | SOFTON™ | 0.91 | 0.30 | 2.1 | 0.49 | 36 | 0.43 |
| Example 8 | 2600 | 0.91 | 0.30 | 2.8 | 0.50 | 13 | 0.33 |
| Example 9 | SOFTON™ | 1.2 | 0.10 | 1.8 | 0.44 | 25 | 0.67 |
| Example 10 | 2200 | 1.2 | 0.10 | 2.9 | 0.50 | 14 | 0.41 |
| Example 11 | | 1.2 | 0.10 | 5.1 | 0.67 | 7.4 | 0.24 |
| Example 12 | SOFTON™ | 1.2 | 0.30 | 2.0 | 0.50 | 37 | 0.60 |
| Example 13 | 2200 | 1.2 | 0.30 | 2.9 | 0.61 | 22 | 0.41 |
| Example 14 | | 1.2 | 0.30 | 5.5 | 0.73 | 15 | 0.22 |
| Example 15 | | 1.2 | 0.30 | 8.3 | 0.83 | 13 | 0.14 |
| Example 16 | SL2200 | 1.6 | 0.10 | 3.2 | 0.53 | 21 | 0.50 |
| Example 17 | | 1.6 | 0.10 | 5.1 | 0.73 | 8.7 | 0.31 |
| Example 18 | | 1.6 | 0.10 | 7.6 | 0.61 | 7.5 | 0.21 |
| Example 19 | SL2200 | 1.6 | 0.30 | 3.6 | 0.66 | 29 | 0.44 |
| Example 20 | | 1.6 | 0.30 | 5.3 | 0.89 | 22 | 0.30 |
| Example 21 | | 1.6 | 0.30 | 8.4 | 0.88 | 23 | 0.19 |

TABLE 2

| | Calcium carbonate | | | Film | | | |
|---|---|---|---|---|---|---|---|
| | Type | Average particle size d (μm) | Added amount (phr) | Thickness t (μm) | St (μm) | Pc (number of protrusions/ 0.1 mm$^2$) | d/t (—) |
| Comparative Example 1 | Not added | — | — | 2.0 | — | 2.0 | — |
| Comparative Example 2 | | — | — | 3.0 | — | 0.3 | — |
| Comparative Example 3 | Brilliant 1500 | 0.38 | 0.30 | 3.0 | 0.35 | 4.2 | 0.13 |

TABLE 2-continued

| | Calcium carbonate | | | Film | | |
|---|---|---|---|---|---|---|
| | Type | Average particle size d (μm) | Added amount (phr) | Thickness t (μm) | St (μm) | Pc (number of protrusions/ 0.1 mm²) | d/t (—) |
| Comparative Example 4 | SOFTON ™ 3200 | 0.86 | 0.10 | 5.5 | 0.43 | 2.7 | 0.16 |
| Comparative Example 5 | | 0.86 | 0.10 | 8.1 | 0.56 | 1.8 | 0.11 |
| Comparative Example 6 | SOFTON ™ 3200 | 0.86 | 0.30 | 5.3 | 0.60 | 3.5 | 0.16 |
| Comparative Example 7 | | 0.86 | 0.30 | 8.2 | 0.60 | 4.3 | 0.10 |
| Comparative Example 8 | SOFTON ™ 2600 | 0.91 | 0.10 | 5.4 | 0.60 | 2.8 | 0.17 |
| Comparative Example 9 | | 0.91 | 0.10 | 7.8 | 0.59 | 2.5 | 0.12 |
| Comparative Example 10 | SOFTON ™ 2600 | 0.91 | 0.30 | 5.2 | 0.77 | 3.0 | 0.18 |
| Comparative Example 11 | | 0.91 | 0.30 | 7.8 | 0.54 | 6.0 | 0.12 |
| Comparative Example 12 | SOFTON ™ 2200 | 1.2 | 0.10 | 8.0 | 0.75 | 4.4 | 0.15 |
| Comparative Example 13 | SL2200 | 1.6 | 0.10 | — | — | — | 0.80 |
| Comparative Example 14 | | 1.6 | 0.30 | — | — | — | 0.80 |

TABLE 3

| | Coefficient of static friction (—) | Winding property | Film processability | Breakdown voltage (kV/mm) |
|---|---|---|---|---|
| Example 1 | 0.39 | A | A | 682 |
| Example 2 | 0.45 | A | A | 781 |
| Example 3 | 0.42 | A | A | 622 |
| Example 4 | 0.47 | A | A | 729 |
| Example 5 | 0.43 | A | A | 628 |
| Example 6 | 0.48 | A | A | 766 |
| Example 7 | 0.44 | A | A | 626 |
| Example 8 | 0.47 | A | A | 653 |
| Example 9 | 0.48 | A | A | 661 |
| Example 10 | 0.45 | A | A | 706 |
| Example 11 | 0.48 | A | A | 749 |
| Example 12 | 0.45 | A | A | 500 |
| Example 13 | 0.46 | A | A | 605 |
| Example 14 | 0.49 | A | A | 701 |
| Example 15 | 0.49 | A | A | 681 |
| Example 16 | 0.44 | A | A | 640 |
| Example 17 | 0.44 | A | A | 703 |
| Example 18 | 0.47 | A | A | 714 |
| Example 19 | 0.47 | A | A | 601 |
| Example 20 | 0.45 | A | A | 671 |
| Example 21 | 0.47 | A | A | 644 |
| Comparative Example 1 | 0.64 | B | A | 651 |
| Comparative Example 2 | 0.69 | B | A | 850 |
| Comparative Example 3 | 0.64 | B | A | 761 |
| Comparative Example 4 | 0.54 | B | A | 801 |
| Comparative Example 5 | 0.58 | B | A | 771 |
| Comparative Example 6 | 0.56 | B | A | 782 |
| Comparative Example 7 | 0.58 | B | A | 745 |
| Comparative Example 8 | 0.54 | B | A | 786 |
| Comparative Example 9 | 0.52 | B | A | 767 |
| Comparative Example 10 | 0.53 | B | A | 773 |
| Comparative Example 11 | 0.58 | B | A | 724 |
| Comparative Example 12 | 0.51 | B | A | 714 |
| Comparative Example 13 | — | — | B | — |
| Comparative Example 14 | — | — | B | — |

INDUSTRIAL APPLICABILITY

The vinylidene fluoride resin film according to an embodiment of the present invention can be used as film materials for film capacitors for communication, electronic devices, power supply, medium/low voltage phase-advance, automated external defibrillators, and in particular inverters as automobile components, or film materials for piezoelectric elements, pyroelectric elements, dielectrics for supporting a transfer body, and the like.

The invention claimed is:

1. A vinylidene fluoride resin film comprising a film composition comprising a vinylidene fluoride resin and inorganic particles, wherein
the vinylidene fluoride resin film comprises a plurality of protrusions on at least one surface thereof;
among the plurality of protrusions, the number of protrusions greater than 0.10 μm in height from a flat surface at which the protrusions are not present is from 7.0 to 50 per 0.10 mm² of the vinylidene fluoride resin film;
the vinylidene fluoride resin is a vinylidene fluoride homopolymer;
a relationship $0.14 < d/t < 0.75$ is satisfied, where an average particle size of the inorganic particles is d (μm) and a film thickness of the vinylidene fluoride resin film is t (μm); and wherein an average protrusion height of the protrusions is from 0.40 µm to 1.0 µm.

2. The vinylidene fluoride resin film according to claim 1, wherein a coefficient of static friction is from 0.20 to 0.50.

3. The vinylidene fluoride resin film according to claim 1, wherein the film composition comprises from 0.050 parts by weight to 5.0 parts by weight of the inorganic particles, per 100 parts by weight of the vinylidene fluoride resin.

4. The vinylidene fluoride resin film according to claim 1, wherein the inorganic particles are particles of one or more types of inorganic compounds selected from the group consisting of calcium carbonate, aluminum oxide, and magnesium oxide.

5. The vinylidene fluoride resin film according to claim 1, wherein a film thickness is from 1.0 µm to 10 µm.

6. The vinylidene fluoride resin film according to claim 1, wherein an average particle size of the inorganic particles is from 0.50 µm to 2.0 µm.

\* \* \* \* \*